2,801,222

ANION EXCHANGE RESINS CONTAINING KETO GROUPS

Albert H. Greer, Westmont, N. J., assignor to The Permutit Company, New York, N. Y., a corporation of Delaware No Drawing. Application June 4, 1952,
Serial No. 291,790

20 Claims. (Cl. 260—2.1)

The present invention relates to anion exchange resins, their novel intermediates and to a novel process for preparing the same. These resins are highly basic anion exchange resins and more particularly, highly basic resins produced by the polymerization of a ketone having one or more unsaturated quaternary ammonium substituents.

Anion exchange resins in order to be satisfactory must be substantially insoluble in water, dilute acids and alkalies. They must be capable of resisting physical deformation or mechanical disintegration when in contact with the solution they are used to treat. A successful anion exchange resin must have both a high useful or operating capacity for removing anions from the aqueous solution and be capable of being repeatedly regenerated for reuse. It is also important that they have a high "salt-splitting" capacity or capacity for the removal of weakly acidic anions, such as carbon dioxide and silica. In order to accomplish efficient removal of weak anions from aqueous solutions, they must be highly basic in nature. The highly basic anion exchange resins of the present invention are highly satisfactory in that they fulfil all of these requirements.

It is an object of the present invention to provide a highly basic, water and dilute acid and alkali-insoluble resin product in the form of a polymer of a ketone containing one or more unsaturated aliphatic quaternary ammonium groupings.

It is a further object of this invention to provide an anion exchange resin which may be suitably prepared in hard granular or spherical bead form.

It is another object of the present invention to provide a substantially insoluble resin which is suitable for removing anions from, or exchanging anions in, water.

It is also an object of the present invention to provide quaternary ammonium salts of a ketone and of a corresponding tertiary amine from which the quaternary ammonium salts may be prepared.

Further objects of the invention will be apparent from the description which follows.

The present invention comprises a cross-linked, highly basic anion exchange resin consisting of a polymerizate of a compound having one or more quaternary ammonium groupings substituted on a ketone, the resulting compound having at least two unsaturated or alkylene substituents. More particularly, the invention comprises a cross-linked polymerizate of a quaternary ammonium salt of the following formula:

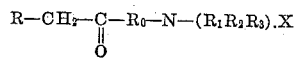

wherein R is hydrogen, saturated and unsaturated aliphatic groups and preferably lower aliphatic groups, aryl, acetonyl or a group of the formula:

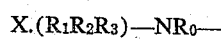

$R_0$ is an alkylene group and preferably a lower alkylene group, $R_1$, $R_2$ and $R_3$ are saturated and unsaturated aliphatic groups and preferably lower aliphatic groups, and aralkyl groups, and X is an anion and more suitably a strongly polar anion, such as a halide, sulfate or nitrate. At least two of the R, $R_1$, $R_2$ and $R_3$ groups in the molecule are unsaturated aliphatic groups, such as an unsaturated alkyl group. In the preferred polymerizate of the invention, $R_0$ is an ethylene group and one or more of $R_1$, $R_2$ and $R_3$ is an allyl group. Those polymerizates in which R represents a second quaternary ammonium salt grouping are particularly advantageous since these compounds have a potentially greater total capacity for removing anions from solution. These di-quaternary ammonium polymerizates have a potential capacity for removing two anion equivalents for each molecular unit of the polymerizate.

To obtain a polymerizate of particularly hard physical properties, it was found necessary that the quaternary ammonium salt employed contain at least two unsaturated groups, such as lower alkylene groups (R, $R_1$, $R_2$ or $R_3$), and particularly allyl groups, so that suitable cross-linking sites are available. These unsaturated groups are most beneficial when substituting the nitrogen atom of the quaternary ammonium groupings (groups $R_1$, $R_2$ or $R_3$). If the secondary amine used to produce the tertiary amine contains only one unsaturated aliphatic substituent, the tertiary amine should be quaternized with an unsaturated aliphatic quaternizing agent, such as an allyl halide.

The present invention also comprises the novel corresponding quaternary ammonium salt compounds which may be polymerized by an oxidizing catalyst to form the cross-linked polymerizates of the invention.

The present invention also comprises the novel tertiary amines which may be converted to the novel quaternary ammonium salts by treatment with an appropriate alkylating or quaternizing agent. These tertiary amines are of the structure:

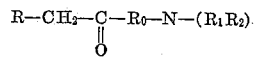

in which the various "R" groups have the same definitions as stated above, at least two of the "R" groups being unsaturated.

The present invention also relates to the novel processes for preparing the novel cross-linked polymerizates, quaternary ammonium salts and tertiary amines of the invention. In general terms, the first of these processes comprises the reaction of a secondary amine with a ketone having one or more active hydrogen atoms in the presence of an aqueous aliphatic lower aldehyde. Best results have been obtained when the aliphatic aldehyde is formaldehyde, such as the 40% aqueous solution, formalin, and its polymers, such as paraformaldehyde. The aliphatic aldehydes used may be any aldehyde containing three carbon atoms or less, such as formaldehyde, acetaldehyde and n-propylaldehyde. Where commercial polymers are available, such as paraformaldehyde and paraldehyde, these may be satisfactorily used. The secondary amine should have one unsaturated aliphatic substituent and may have two such substituents. The preferred unsaturated aliphatic group is the allyl group, i. e., one having a terminal unsaturated linkage. In addition to the allyl group, the vinyl group is also satisfactory. Examples of secondary amines which are suitable are diallylamine, allylmethylamine, allylethylamine, allylbenzylamine, divinylamine, methylvinylamine, vinylallylamine, etc. The preferred ketones are acetone and the mono-lower alkylene substituted acetones. Examples of the ketones which may be used are those containing one or more active alpha-hydrogen atoms, such as acetone, methylethylketone, methylpropylketone, diethylketone, acetonylacetone, methylvinylketone, methylisopropenylketone, ethylvinylketone, methylpropylketone, methylbutylketone and methylisobutylketone. In those instances where the ketone used has an unsaturated hydrocarbon substituent, any secondary aliphatic amine, including the saturated amines, may be used. Examples of the saturated amines are dimethylamine, methyl-ethylamine, methylbutylamine, methylbenzylamine, etc.

The tertiary amine which is produced from the reaction of the ketone, aldehyde and secondary amine may then be converted to the corresponding quaternary ammonium salt by treating the tertiary amine, after it has been suitably dried, e. g., treated with anhydrous sodium sulfate, with any of the well known alkylating or quaternizing agents known to the art, such as the halides sulfates, nitrates, sulfonates, phosphates, etc. Examples of suitable quaternization agents are the allyl and alkyl halides, the dialkyl sulfates, the benzyl halides, such as the chloride, the epihalohydrins, such as epichlorohydrin, and the toluene sulfonates. It is preferred that the quaternizing agent be one in which the anion has strong polar characteristics, such as sulfate, nitrate and halide. The polymerizates of the quaternary ammonium salts of these highly polar anions are more easily polymerized and produce polymerizate beads of superior hardness.

Illustrating these processes of preparing the novel tertiary amines and their corresponding quaternary ammonium salts, using formaldehyde as the particular lower aliphatic aldehyde, are reactions represented by the following equations:

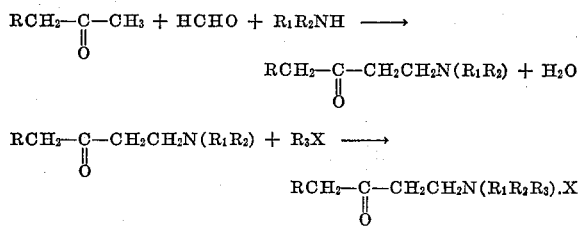

The cross-linked polymerizates, which are superior anion exchange resins, may be prepared by polymerizing the quaternary ammonium salts prepared above. Polymerization is accomplished by mixing the quaternary ammonium salt with a suitable catalyst. In general, the peroxides or so-called oxidizing catalysts are satisfactory. To date, a 60% solution of tertiary-butyl-hydroperoxide in butyl alcohol has been found most suitable. Other catalysts, such as benzoylperoxide, di-tertiary-butylperoxide, hydrogen peroxide, and the alkali persulfates are also satisfactory. Beads of the resulting cross-linked polymerizate are prepared by pouring the mixture in the form of a fine stream into a well-stirred bath of a non-reactive material, such as mineral oil or Dowtherm (which is a mixture of diphenyl and diphenyl oxide) which has been heated to a temperature of about 100° to 125° C. The stirring is continued until hard spherical beads are obtained. In order to convert the polymerizate into the hydroxide exchanging condition to be suitable for anion exchange purposes, the beads are treated with a dilute aqueous alkali hydroxide solution, such as a 3 to 10% solution of sodium hydroxide. The anion enchange polymerizate is then ready to perform anion exchange or removal by placing the polymerizate in contact with an aqueous solution containing the anions to be exchanged.

In the preparation of polymers having the hard physical properties of the invention, it is necessary that the resulting quaternary ammonium salt have at least two unsaturated aliphatic groupings in the molecule. If a di-unsaturated secondary amine is used as the starting secondary amine, then the remaining alkyl groups in the molecule may be either saturated or may be an additional unsaturated aliphatic group. If the secondary amine used has one saturated alkyl group, it is necessary that the tertiary amine produced be quaternized with an unsaturated alkylating agent, such as an allyl halide. Additionally, it is permissible to utilize as one of the unsaturated sites a ketone having an unsaturated aliphatic grouping, such as, for example, methylvinylketone. An example of this procedure is to react methylvinylketone with a saturated dialkylamine with formaldehyde and quaternize the resulting tertiary amine with an unsaturated quaternizing agent, such as an allyl halide. There is no objection to having more than two unsaturated groupings in the molecule and quaternary ammonium salts containing three allyl groups are highly satisfactory. Also, the second unsaturated aliphatic linkage may be effected by introducing a second quaternary ammonium grouping, such as by condensing a ketone containing two active alpha hydrogen atoms, such as acetonylacetone with a saturated aliphatic secondary amine in the presence of a lower aldehyde.

These processes contribute numerous advantages which are not always obtainable in the preparation of other basic anion exchange resins. For example, it is not necessary to isolate pure crystalline intermediate materials to obtain a good polymerizate. The yields obtained in each step in the preparation of the various intermediates are quite high and are usually in the order of 90–95% of the theoretically obtainable yields. Also, the novel quaternary ammonium salts to be polymerized are fluid at ordinary temperatures and can be easily handled. The fact that they are fluid permits polymerization without any intermediate treatment to make them soluble as they are in suitable form for direct contact with the polymerization catalyst.

In order more clearly to disclose the nature of the present invention, specific examples illustrating the preparation of typical compounds will hereinafter be described. It should be understood, however, that this is done solely by way of example and is intended neither to delineate the scope of the invention nor limit the ambit of the appended claims. Unless otherwise stated, quantities of materials are referred to in terms of parts by weight.

Example 1

About 190 parts of a 37% solution of formaldehyde (2.3 mol) were added dropwise at 20° to 25° C. to a well-stirred mixture of 58 parts (1.0 mol) of acetone and 250 parts (2.6 mol) of diallylamine. The addition required about one hour. The mixture was stirred for one hour longer and then heated to reflux for 4–6 hours. Upon cooling, two layers were formed and the lower layer discarded. Two hundred parts of an oily residue were obtained and were used for the next reaction without further purification. The neutralization equivalent found indicated that the material had a molecular weight similar to that of 1-diallylamino-3-butanone.

One hundred parts of this oil were heated under reflux for six hours with 78 parts of allyl bromide. Any unreacted allyl bromide was poured off and 160 parts of a thick oil remained whose bromine analysis indicated the desired N-triallyl-3-butanone ammonium bromide.

Sixty parts of the quaternary ammonium salt were warmed to 50–60° C. and mixed with 9 ml. of a 60% solution of tertiary-butyl-hydroperoxide. The mixture was poured in a thin stream into two liters of well-stirred mineral oil that had been heated to 110–120° C. Polymerization began within thirty minutes. The mixture was further heated for 6–8 hours at this temperature; the beads resulting were filtered from the oil, washed with alcohol or any suitable solvent and screened to select those particles small enough to pass through a 20 mesh screen and too large to pass through a 40 mesh screen. The material had a salt-splitting capacity of 3.3 kgr./cu. ft. and a total ultimate capacity of 40.2 kgr./cu. ft. The density of the exhausted material was 20 lbs./cu. ft. The salt splitting value of this material was raised to 7.8 kgr./cu. ft. by treating the polymer with an alcoholic solution of dimethyl sulfate.

As used in the above paragraph and elsewhere in this specification, the term "salt-splitting capacity" (sometimes referred to as "basicity value") is a measure of the capacity of the anion exchange resin to remove the anions of weak acids. Since the value of a highly basic anion exchange resin may often reside in its ability to remove the anions of weak acids, as well as those of strong acids, this is a critical value of the performance of any basic anion exchange resin. As expressed here, this value is obtained by passing 270 ml. of a 0.75 normal sodium hydroxide solution through a 16 ml. column containing 40 ml. of the anion exchange resin at a flow rate of approximately 5 ml. per minute. This places the anion exchange resin or polymerizate in the hydroxide exchanging condition. The resin bed is rinsed as free as possible of phenolphthalein alkalinity with distilled water. 750 ml. of 0.5 normal sodium chloride solution is next passed through the resin bed at a flow rate of 7.5 ml. per minute. The column is washed with distilled water. The effluent and washings from the sodium chloride treatment are collected and mixed and titrated with 0.02 normal sulfuric acid solution to a methyl orange endpoint. Since the strongly basic anion exchange resin will remove chloride ion from the sodium chloride solution and convert sodium chloride to sodium hydroxide, this determination permits the calculation of the sodium chloride converted to sodium hydroxide giving the "salt-splitting" capacity of the anion exchange resin. This sodium chloride splitting value is expressed in kilograins of calcium carbonate per cubic foot of anion exchange resin. Resins having a high "salt-splitting" value will have a high capacity for the removal of weak acids, such as silicic acid and carbonic acid from solutions.

Example 2

About 160 parts of 1-diallylamino-3-butanone, obtained as in Example 1, were warmed with 120 parts of dimethyl sulfate at 80–90° C. for six hours. The excess dimethyl sulfate was removed by pouring off and 260 parts of a thick viscous oil were obtained. From a determination of the sulfur content, the material was N,N-diallyl, N-methyl-3-butanone ammonium methosulfate.

Sixty grams of the monomeric quaternary ammonium salt prepared above were heated to 70° C. and 9 ml. of a 60% solution of tertiary-butyl-hydroperoxide were added at once. The mixture was immediately poured in a thin stream into two liters of well-stirred mineral oil that had been heated to 110–120° C. Polymerization began within thirty minutes; the beads which formed were removed from the oil and washed with alcohol or any suitable solvent. The beads were then alkylated with a mixture of epichlorhydrin and allyl chloride to yield an anion exchange material whose salt-splitting capacity was 7.4 kgr./cu. ft. and whose total ultimate capacity was 23 kgr./cu. ft. The wet density of the material in the regenerated state was 12 lbs./cu. ft.

Example 3

About 80 parts of a 37% aqueous solution of formaldehyde (1.65 mol) were added slowly, with stirring, to a previously cooled mixture of 52 parts (0.5 mol) of acetonylacetone and 125 parts (1.3 mol) of diallylamine at 20–25° C. After stirring for one hour, the mixture was heated at 70° C. and stirring continued at this temperature for 4–6 hours. The upper layer was removed when cool. One hundred and seventy-four parts of an oil were obtained whose molecular weight was determined and shown to be that which corresponds to 1,8-bis-(diallylamino)-3,6-octadione.

One hundred parts of the above material were warmed with 76 parts of dimethyl sulfate at 80–90° C. for six hours. One hundred and seventy parts of a thick viscous oil were obtained whose sulfur content indicated the quaternary salt to be the bis methosulfate salt of 1,8-bis-(diallylamino)-3,6-octadione.

Sixty parts of the amino product were heated to 70° C. and mixed with 9 ml. of a 60% solution of tertiary-butyl-hydroperoxide. The mixture was poured in a thin stream into two liters of well-stirred mineral oil or "Dowtherm" (which is a mixture of diphenyl and diphenyl oxide) that had been heated to 110–120° C. Polymerization occurred in about an hour. The mixture was heated for 6–8 hours at this temperature; the beads which formed were removed from the oil, washed with alcohol or any suitable solvent and then heated with a mixture of epichlorhydrin and allyl chloride. The resulting bead polymer had a salt-splitting value of 2.6 kgr./cu. ft. and a total capacity of 16.2 kgr./cu. ft. The wet density in the regenerated state was 7 lbs./cu. ft.

As has been stated earlier in this specification, reactants other than those utilized in the specific examples above may be used and in which case, other polymerizates of quaternary ammonium salts according to the invention may be thus prepared. For example, if there is used in Example 1 instead of diallylamine the following secondary amines: allylmethylamine, allylpropylamine, allylbutylamine and vinylmethylamine, the resulting quaternary ammonium salts are: N,N-diallyl-N-methyl-3-butanone ammonium bromide; N,N-diallyl-N-propyl-3-butanone ammonium bromide; N,N-diallyl-N-butyl-3-butanone ammonium bromide; and N-vinyl-N-methyl-N-allyl-3-butanone ammonium bromide, respectively. Other aldehydes than formaldehyde may be used. Other quaternizing agents may be used. If the allyl bromide in Example 1 is replaced with p-toluene sulfonate and benzyl chloride, the resulting quaternary ammonium salts are: the p-toluene sulfonate salt of N,N-diallylamino-3-butanone and N,N-diallyl-N-benzyl-3-butanone ammonium chloride, respectively.

The terms and expressions which have been employed are used as terms of description and not of limitation, and it is not intended, in the use of such terms and expressions, of excluding any equivalents of the features shown and described or portions thereof, but it should be recognized that various modifications are possible within the scope of the invention claimed.

What is claimed is:

1. A highly basic anion exchange resin comprising a cross-linked polymerizate of a quarternary ammonium compound having a formula selected from the formulae:

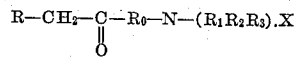

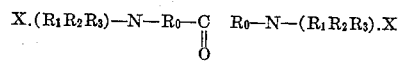

and

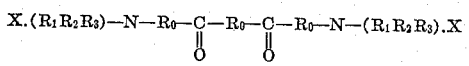

wherein $R_0$ is an alkylene group having at least two carbon atoms, is in a position alpha to every carbonyl group and in which the adjacent nitrogen atom is substituted on a carbon atom beta to the nearest carbonyl group; R is a member selected from the class consisting of hydrogen, lower alkyl, terminal ethylenically unsaturated lower alkenyl groups, aryl and acetonyl; $R_1$, $R_2$ and $R_3$ are members selected from the class consisting of lower alkyl, aralkyl and terminal ethylenically unsaturated lower alkenyl groups; and X is an anion; at least two of groups R, $R_1$, $R_2$ and $R_3$ in the molecule are terminal ethylenically unsaturated lower alkenyl groups.

2. A highly basic anion exchange resin as defined by claim 1 wherein $R_0$ is a lower alkylene group and X is a strongly polar anion.

3. A highly basic anion exchange resin comprising a cross-linked polymerizate according to claim 2 wherein at least two of the groups R, $R_1$, $R_2$ and $R_3$ in the molecule are allyl groups.

4. A highly basic anion exchange resin comprising a cross-linked polymerizate of 1-N-triallyl-3-butanone-ammonium bromide.

5. A highly basic anion exchange resin comprising a cross-linked polymerizate of 1-(N,N-diallyl-N-methyl)-3-butanone-ammonium sulfate.

6. A highly basic quaternary ammonium anion exchange resin comprising a cross-linked polymerizate of a bis methosulfate salt of 1,8-bis-(diallylamino)-3,6-octadione.

7. A quaternary ammonium compound having a formula selected from the formulae:

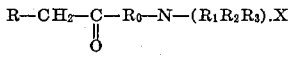

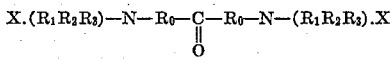

and

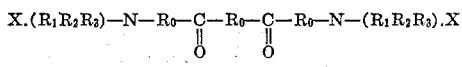

wherein $R_0$ is an alkylene group having at least two carbon atoms, is in a position alpha to every carbonyl group and in which the adjacent nitrogen atom is substituted on a carbon atom beta to the nearest carbonyl group; R is a member selected from the class consisting of hydrogen, lower alkyl, terminal ethylenically unsaturated lower alkenyl groups, aryl and acetonyl; $R_1$, $R_2$ and $R_3$ are members selected from the class consisting of lower alkyl, aralkyl and terminal ethylenically unsaturated lower alkenyl groups; and X is an anion; at least two of groups R, $R_1$, $R_2$ and $R_3$ in the molecule are terminal ethylenically unsaturated lower alkenyl groups.

8. A quaternary ammonium compound as defined by claim 7, wherein $R_0$ is a lower alkylene group and X is a strongly polar anion.

9. A quaternary ammonium compound according to claim 8 wherein at least two of the groups R, $R_1$, $R_2$ and $R_3$ in the molecule are allyl groups.

10. The quaternary ammonium compound, 1-N-triallyl-3-butanone-ammonium bromide.

11. The quaternary ammonium compound, 1-(N,N-diallyl-N-methyl)-3-butanone-ammonium sulfate.

12. The quaternary ammonium compound, bis methosulfate salt of 1,8-bis-(diallylamino)-3,6-octadione.

13. A tertiary amine compound having a formula selected from the formulae:

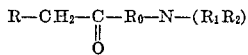

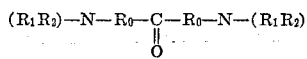

and

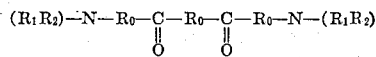

wherein $R_0$ is an alkylene group having at least two carbon atoms, is in a position alpha to every carbonyl group and in which the adjacent nitrogen atom is substituted on a carbon atom beta to the nearest carbonyl group; R is a member selected from the class consisting of hydrogen, lower alkyl, terminal ethylenically unsaturated lower alkenyl groups, aryl and acetonyl; $R_1$ and $R_2$ are members selected from the class consisting of lower alkyl, aralkyl and terminal ethylenically unsaturated lower alkenyl groups; at least two of groups R, $R_1$ and $R_2$ in the molecule are terminal ethylenically unsaturated lower alkenyl groups.

14. A tertiary amine compound as defined by claim 13, wherein $R_0$ is a lower alkylene group.

15. A tertiary amine according to claim 14 wherein at least two of the groups R, $R_1$, $R_2$ and $R_3$ in the molecule are allyl groups.

16. A process of removing anions from an aqueous solution which comprises contacting such solution with an anion exchange resin which is substantially insoluble in water, dilute acids and alkalies, said resin being a cross-linked polymerizate as defined by claim 1.

17. The process for the preparation of a highly basic anion exchange resin comprising a cross-linked polymerizate of a quaternary ammonium compound having a formula selected from the formulae:

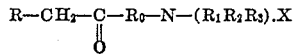

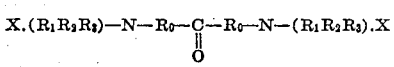

and

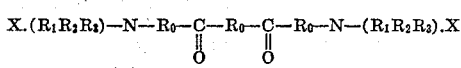

wherein $R_0$ is an alkylene group having at least two carbon atoms, is in a position alpha to every carbonyl group and in which the adjacent nitrogen atom is substituted on a carbon atom beta to the nearest carbonyl group; R is a member selected from the class consisting of hydrogen, lower alkyl, terminal ethylenically unsaturated lower alkenyl groups, aryl and acetonyl; $R_1$, $R_2$ and $R_3$ are members selected from the class consisting of lower alkyl, aralkyl and terminal ethylenically unsaturated lower alkenyl groups; and X is an anion; at least two of groups R, $R_1$, $R_2$ and $R_3$ in the molecule are terminal ethylenically unsaturated lower alkenyl groups, which process comprises treating the quaternary ammonium compound with a peroxy polymerization catalyst.

18. The process of producing a quaternary ammonium compound having a formula selected from the formulae:

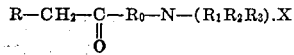

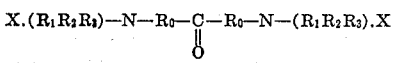

and

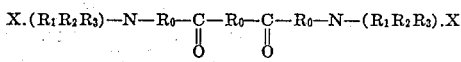

wherein $R_0$ is an alkylene group having at least two carbon atoms, is in a position alpha to every carbonyl group and in which the adjacent nitrogen atom is substituted on a carbon atom beta to the nearest carbonyl group; R is a member selected from the class consisting of hydrogen, lower alkyl, terminal ethylenically unsaturated lower alkenyl groups, aryl and acetonyl; $R_1$, $R_2$ and $R_3$ are members selected from the class consisting of lower alkyl, aralkyl and terminal ethylenically unsaturated lower alkenyl groups; and X is an anion; at least two of groups R, $R_1$, $R_2$ and $R_3$ in the molecule are terminal ethylenically unsaturated lower alkenyl groups, which process comprises treating the corresponding tertiary amine with a compound of the formula:

wherein $R_3$ and X have the same definitions as above.

19. The process of producing a tertiary amine compound having a formula selected from the formulae:

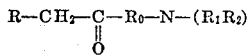

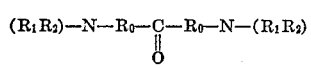

and

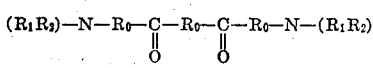

wherein $R_0$ is an alkylene group having at least two carbon atoms, is in a position alpha to every carbonyl group and in which the adjacent nitrogen atom is substituted on a carbon atom beta to the nearest carbonyl group;

R is a member selected from the class consisting of hydrogen, lower alkyl, terminal ethylenically unsaturated lower alkenyl groups, aryl and acetonyl; $R_1$ and $R_2$ are members selected from the class consisting of lower alkyl, aralkyl and terminal ethylenically unsaturated lower alkenyl groups; at least two of groups R, $R_1$ and $R_2$ in the molecule are terminal ethylenically unsaturated lower alkenyl groups, which process comprises treating a ketone of the formula:

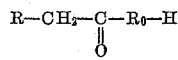

with a secondary amine of the formula:

$$(R_1R_2)-N-H$$

in the presence of a saturated lower aliphatic aldehyde; wherein R, $R_1$, $R_2$ and $R_0$ in the last two formulae have the same definitions as above.

20. The process of producing a highly basic anion exchange resin comprising a cross-linked polymerizate of a quaternary ammonium compound having a formula selected from the formulae:

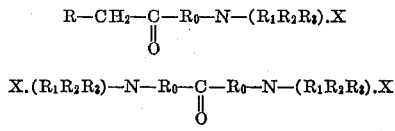

and

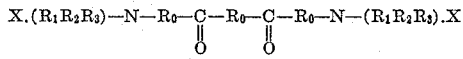

wherein $R_0$ is an alkylene group having at least two carbon atoms, is in a position alpha to every carbonyl group and in which the adjacent nitrogen atom is substituted on a carbon atom beta to the nearest carbonyl group; R is a member selected from the class consisting of hydrogen, lower alkyl, terminal ethylenically unsaturated lower alkenyl groups, aryl and acetonyl; $R_1$, $R_2$ and $R_3$ are members selected from the class consisting of lower alkyl, aralkyl and terminal ethylenically unsaturated lower alkenyl groups; and X is an anion; at least two of groups R, $R_1$, $R_2$ and $R_3$ in the molecule are terminal ethylenically unsaturated lower alkenyl groups, which process comprises treating a ketone of the formula:

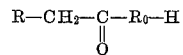

with a secondary amine of the formula:

$$(R_1R_2)-N-H$$

in the presence of a saturated lower aliphatic aldehyde, quaternizing the resulting tertiary amine with an alkylating agent of the formula:

$$R_3X$$

and polymerizing the resulting quaternary ammonium salt with a peroxy polymerization catalyst; wherein R, $R_1$, $R_2$, $R_3$, $R_0$ and X in the last three formulae have the same definitions as above.

References Cited in the file of this patent

UNITED STATES PATENTS 2,276,149    Bock _____ Mar. 10, 1942

OTHER REFERENCES

Richter: Organic Chemistry, vol. I, translated by Spielman, Blakiston; rec. October 31, 1925. Copy in Scie. Lib.; page 189.

Adams et al.: Organic Reactions, vol. I, Wiley, 1942, pp. 204, 305, 328 to 330, 332, 336 and 337. (Copy in Scie. Libr.)

Butler et al.: Journ. Am. Chem. Soc., vol. 71, pp. 3120 to 3122, September 1949. Copy in Scie. Libr.

Webster's "New International Dictionary," 2nd ed., page 67, item "alkylene" (1956). G. & C. Merriam Co., Publishers, Springfield, Mass. (Copy in Sci. Lib.)